Patented Sept. 8, 1931

1,822,008

UNITED STATES PATENT OFFICE

JÜRGEN CALLSEN, OF ELBERFELD, GERMANY, ASSIGNOR TO WINTHROP CHEMICAL COMPANY, INC., OF NEW YORK, N. Y., A CORPORATION OF NEW YORK

TRIBROMOALCOHOLS AND PROCESS OF PREPARING THE SAME

No Drawing.    Application filed June 3, 1930.   Serial No. 459,117.

The present invention relates to new tribromoalcohols and to a process for preparing same.

In accordance with the invention secondary tribromoalcohols of the probable general formula $$Br_3C.CH(OH).alk$$

wherein "alk" means an alkyl group, are prepared by causing tribromo-acetoaldehyde to react with an alkyl-magnesium halide in an indifferent organic solvent, such as ether, benzene and anisol or mixtures thereof and decomposing the intermediate product with water, preferably with the addition of a dilute mineral acid. We prefer to employ as alkyl magnesium halides the bromides, since they can be prepared in a more convenient way than the chlorides and in a cheaper way than the iodides. But also the latter are useful and are therefore intended to be included in my invention. The reaction probably proceeds according to the following equation

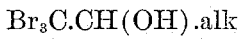

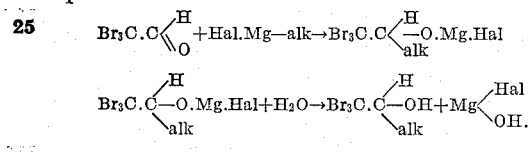

("Hal" means a halogen atom, "alk" an alkyl group).

Sometimes however a secondary reaction takes place, for example when reacting upon tribromo-acetoaldehyde with ethylmagnesiumbromide, besides the 1-tribromo-2-hydroxy-butane, obtainable in accordance with the above equation, tribromoethylalcohol is produced as by-product perhaps according to the following equation (compare Berichte der Deutschen Chemischen Gesellschaft 54 (1921), page 2043)

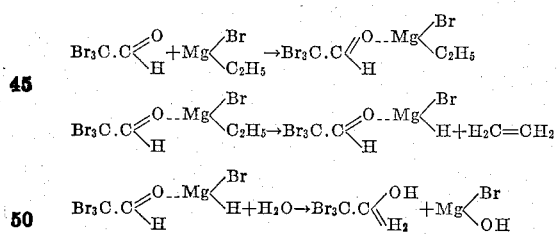

In the described manner may be obtained from the tribromo-acetoaldehyde, for example when starting with methylmagnesiumbromide the tribromo-2-hydroxy-propane, with propylmagnesiumbromide the 1-tribromo-2-hydroxy-n-pentane, with isopropylmagnesiumbromide the 1-tribromo-2-hydroxy-3-methyl-butane, with isobutylmagnesiumbromide the 1-tribromo-2-hydroxy-5-methyl-pentane and the like.

The new products thus obtainable are nearly colorless liquids of characteristic odor, readily soluble in alcohol, ether and acetone, difficultly soluble in water. On heating or treating with diluted alkali they are decomposed with splitting off hydrobromic acid. They are valuable medicines.

The invention is illustrated by the following examples without being limited thereto:—

*Example 1.*—24 grams of magnesium borings are covered with 300 ccs. of ether. Thereto a solution of 110 grams of methylbromide in 400 ccs. of benzene is dropped with stirring and cooling. The solution of methylmagnesiumbromide thus obtainable is poured into a solution of 281 grams of tribromo-acetoaldehyde in 400 ccs. of ether with cooling and stirring.

After some hours the reaction mixture is worked up by the addition of ice water and dilute sulfuric acid. Then the aqueous layer is separated from the ethereal benzene-solution. The latter is washed with water in order to remove any acid reaction and, after drying with sodium sulfate, is freed from the ether and the benzene. When fractionating the remainder in vacuo, the 1-tribomo-2-hydroxy propane distills as a nearly colorless liquid of characteristic odor at 76–79° C. under 5 mm. pressure. It is readily soluble in alcohol, ether and acetone, less soluble in water. On heating with dilute caustic soda lye decomposition occurs with splitting off hydrobromic acid; when adding thereto dilute nitric acid and a solution of silver nitrate, a precipitate of silver bromide is obtained.

*Example 2.*—12 grams of magnesium borings are covered with 200 ccs. of ether. Thereto 60 grams of ethylbromide are gradually added. After dissolving the magnesium borings a solution of 140 grams of tribromo-acetoaldehyde in 250 ccs. of ether is dropped into the mixture which then is worked up according to the direction given in Example 1. By fractional distillation and crystallization of the reaction product, besides the tribromoethylalcohol (while prismatic crystals of melting point 79–80° C.) the 1-tribromo-2-hydroxy-butane of boiling point 79–81° C. under 4 mm. pressure is obtained. It is a nearly colorless liquid of characteristic odor, readily soluble in alcohol and ether, but only sparingly soluble in water. By dilute caustic soda lye it is decomposed as described for the product of Example 1.

I claim:

1. The process which comprises reacting upon tribromo-acetoaldehyde with an alkylmagnesium halide in an indifferent organic solvent and decomposing the product thus obtainable by means of water.

2. The process which comprises reacting upon tribromo-acetoaldehyde with an alkylmagnesium halide in a solvent of the group consisting of ether, benzene, anisol and mixtures thereof, and decomposing the product thus obtainable by means of water.

3. The process which comprises reacting upon tribromo-acetoaldehyde with an alkylmagnesium bromide in a solvent of the group consisting of ether, benzene, anisol and mixtures thereof, and decomposing the product thus obtainable by means of water.

4. The process which comprises reacting upon tribromo-acetoaldehyde with methylmagnesium bromide in a mixture of ether and benzene, and decomposing the product thus obtainable by means of water.

5. Products of the probable general formula $$Br_3C.CH(OH).alk$$

wherein "alk" means an alkyl residue, said products being generally nearly colorless liquids, readily soluble in ether, alcohol and acetone, sparingly soluble in water, being pharmaceutically valuable substances.

6. Products of the probable general formula $$Br_3C.CH(OH).alk$$

wherein "alk" means an alkyl residue from 1–4 carbon atoms, said products being nearly colorless liquids, readily soluble in ether, alcohol and acetone, sparingly soluble in water, being pharmaceutically valuable substances.

7. The product of the probable formula $$Br_3C.CH(OH).CH_3$$

being a nearly colorless liquid of boiling point 76–79° C. under 5 mm. pressure, readily soluble in ether, alcohol and acetone, sparingly soluble in water, being a pharmaceutically valuable substance.

In testimony whereof, I affix my signature.

JÜRGEN CALLSEN.